US012690524B2

(12) United States Patent
Ps et al.

(10) Patent No.: US 12,690,524 B2
(45) Date of Patent: Jul. 28, 2026

(54) SQUARE BALER IMPLEMENT WITH TWO SPEED DRIVETRAIN

(71) Applicant: DEERE & COMPANY, Moline, IL (US)

(72) Inventors: Satyanarayana Ps, Nuzvid (IN); Nikhil Kulkarni, Pune (IN)

(73) Assignee: DEERE & COMPANY, Moline, IL (US)

( * ) Notice: Subject to any disclaimer, the term of this patent is extended or adjusted under 35 U.S.C. 154(b) by 380 days.

(21) Appl. No.: 18/460,749

(22) Filed: Sep. 5, 2023

(65) Prior Publication Data

US 2025/0072331 A1 Mar. 6, 2025

(51) Int. Cl.
| *A01F 15/08* | (2006.01) |
| *A01F 15/04* | (2006.01) |
| *F16H 3/08* | (2006.01) |

(52) U.S. Cl.
CPC ........ *A01F 15/0841* (2013.01); *A01F 15/042* (2013.01); *F16H 3/08* (2013.01)

(58) Field of Classification Search
CPC ...... A01F 15/0841; A01F 15/042; F16H 3/08; F16H 2200/2082; F16H 2200/0034
See application file for complete search history.

(56) References Cited

U.S. PATENT DOCUMENTS

| 8,973,493 B2 * | 3/2015 | O'Reilly | ............. A01F 15/0841 |
| | | | 100/280 |
| 2013/0152805 A1 * | 6/2013 | Roth | ....................... A01F 15/04 |
| | | | 100/35 |

| 2014/0165859 A1 * | 6/2014 | O'Reilly | ............. A01F 15/0841 |
| | | | 100/179 |
| 2016/0081258 A1 | 3/2016 | Bonte | |
| 2021/0137018 A1 * | 5/2021 | De Leener | .......... A01F 15/0841 |
| 2021/0137019 A1 * | 5/2021 | Demon | ..................... F03G 3/08 |
| 2021/0140359 A1 * | 5/2021 | Bonte | ................. F16H 57/0442 |
| 2021/0140848 A1 * | 5/2021 | Derynck | ............... A01F 15/042 |
| 2021/0195842 A1 * | 7/2021 | Williams | .................. F16H 3/32 |

(Continued)

FOREIGN PATENT DOCUMENTS

| EP | 3166384 B1 | 9/2018 |
| EP | 3527064 A1 | 8/2019 |
| EP | 3818809 B1 | 8/2022 |

OTHER PUBLICATIONS

Extended European Search Report and Written Opinion issued in European Patent Application No. 24193787.9 dated Jan. 21, 2025, in 07 pages.

*Primary Examiner* — Farhana Pervin

(57) ABSTRACT

A baler implement includes a gear assembly having an input shaft coupled to a power input, and an output shaft coupled to a flywheel. The gear assembly includes a first input gear coupled to the input shaft and a first output gear coupled to the output shaft to define a first gear ratio, and a second input gear coupled to the input shaft and a second output gear coupled to the output shaft to define a second gear ratio. A first torque control device interconnects the input shaft and one of the first input gear and the second input gear. A second torque control device interconnects the output shaft and one of the first output gear and the second output gear. One of the first torque control device and the second torque control device is controllable to switch between the first gear ratio and the second gear ratio.

18 Claims, 7 Drawing Sheets

(56)  References Cited

U.S. PATENT DOCUMENTS

| | | | |
|---|---|---|---|
| 2021/0251147 A1* | 8/2021 | Bonte | A01F 15/0841 |
| 2021/0259156 A1 | 8/2021 | Bonte et al. | |
| 2022/0124985 A1* | 4/2022 | Kraus | A01F 15/08 |

* cited by examiner

SQUARE BALER IMPLEMENT WITH TWO SPEED DRIVETRAIN

TECHNICAL FIELD

The disclosure generally relates to baler implement, and more particularly to a gear assembly for communicating torque and rotation between a power input with a flywheel of a square baler implement.

BACKGROUND

Agricultural balers gather, compress, and shape crop material into a bale. There are different types of baler implements. One example of a baler implement may be referred to as a square baler implement, and is operable to create a bale having parallelepiped bales, i.e., square bales. Square baler implements have been used in crop harvesting for many years, and utilize a compression system in which a plunger moves in a linear reciprocating motion within a compression chamber. During each stroke of the plunger, the reciprocating plunger compresses the crop in the compression chamber as the plunger moves towards the rear of the baler implement to form a flake. The plunger returns to a forward position, whereafter a new charge of the crop material is introduced into the compression chamber and the process repeats. Multiple flakes are combined to form a bale.

The baler implement is typically powered by a Power Take-Off (PTO) shaft from an associated traction unit, e.g., an agricultural tractor. The PTO shaft provides power in the form of torque and rotation to the baler implement. The PTO shaft is coupled to a transmission. The transmission is coupled to the plunger via a connecting link. The transmission converts the rotational input from the PTO shaft into reciprocating linear movement of the connecting link to move the plunger in the reciprocating motion within compression chamber.

Due to the extreme forces associated with compressing the crop material, the baler implement may include a weighted flywheel disposed between and coupled to the PTO shaft and the transmission. The weighted flywheel provides momentum to maintain movement of the plunger during operation. Because of the weight of the flywheel, when preparing the baler implement for operation, a large amount of torque is required to bring the flywheel from a stop up to an operating speed. Engagement of the PTO shaft when the flywheel is stopped may stall the engine of the associated traction unit if the engine is not powerful enough. The significant power requirements necessary to bring the weighted flywheel up to operating speed are not generally required for normal baling operations. The weight of the flywheel should be increased as the desired compression and size of the baler implement increases. Increasing the weight and size of the flywheel generally requires an increase in the size and power of the traction unit to provide initial flywheel startup. However, increasing the size and power of the engine of the associated traction unit reduces fuel efficiency of the baling operation.

SUMMARY

A baler implement is provided. The baler implement includes a power input operable to rotate and communicate torque. A gear assembly includes an input shaft and an output shaft. The input shaft is coupled to the power input for rotation with the power input. A flywheel is coupled to the output shaft of the gear assembly for rotation with the output shaft. The gear assembly includes a first input gear coupled to the input shaft and a first output gear coupled to the output shaft. The first input gear and the first output gear are disposed in meshing engagement to define a first gear ratio between the power input and the flywheel. The gear assembly further includes a second input gear coupled to the input shaft and a second output gear coupled to the output shaft. The second input gear and the second output gear are disposed in meshing engagement to define a second gear ratio between the power input and the flywheel. A first torque control device interconnects the input shaft and one of the first input gear and the second input gear for controlling torque communication therebetween. A second torque control device interconnects the output shaft and one of the first output gear and the second output gear for controlling torque communication therebetween. At least one of the first torque control device and the second torque control device is selectively controllable to switch torque communication between the power input and the flywheel between the first gear ratio and the second gear ratio.

In one aspect of the disclosure, the first torque control device may include one of, but is not limited to, a one way clutch or a selectively controllable clutch. As is understood by those skilled in the art, the one way clutch is operable to communicate torque in a first rotational direction and freewheel in a second rotational direction. The selectively controllable clutch may include, but is not limited to, a clutch mechanism that is controllable between a first state operable to connect torque communication between two components, and a second state operable to disconnect torque communication between the two components.

In one implementation, the first torque control device is a one way clutch that is operable to communicate torque in a first rotational direction and freewheel in a second rotational direction. The first torque control device interconnects the first input gear and the input shaft. The second input gear is rotatably fixed relative to the input shaft for continuous rotation with the input shaft at a shared rotational speed.

The second torque control device may include, but is not limited to, one of a one way clutch or a selectively controllable clutch device. As is understood by those skilled in the art, the one way clutch is operable to communicate torque in a first rotational direction and freewheel in a second rotational direction. The selectively controllable clutch may include, but is not limited to, a clutch mechanism that is controllable between a first state operable to connect torque communication between two components, and a second state operable to disconnect torque communication between the two components.

In one implementation, the second torque control device is a selectively controllable clutch that is controllable between a first state operable to connect torque communication and a second state operable to disconnect torque communication. The second torque control device interconnects the second output gear and the output shaft. The first output gear is rotatably fixed relative to the output shaft for continuous rotation with the output shaft at a shared rotational speed.

In one aspect of the disclosure, the gear assembly may include a friction element that is coupled to a stationary component of the gear assembly. The stationary component may include, for example, an assembly housing or casing of the gear assembly. A brake element is attached to the output shaft for rotation therewith. The brake element is selectively controllable between a brake position and a release position. When the brake element is disposed in the brake position, the brake element is disposed in frictional engagement with the friction element. When the brake element is disposed in the release position, the brake element is not disposed in frictional engagement with the friction element.

In one aspect of the disclosure, the baler implement further includes a transmission that is coupled to the flywheel for rotation therewith. The transmission is operable to convert rotation from the flywheel into reciprocating linear movement of a connecting link. A plunger is coupled to the connecting link. The plunger is disposed within a compression chamber and is moveable within the compression chamber in a reciprocating linear motion to form a bale having a parallelepiped shape.

In one aspect of the disclosure, the power input may include, but is not limited to a Power Take Off (PTO) shaft. The PTO shaft is coupled to a power source, such as but not limited to, an engine or motor of an associated traction unit, e.g., an agricultural tractor. In other implementations, the power input may include an electric motor, hydraulic motor, or some other mechanism capable of generating torque and rotation.

A method of controlling a baler implement is also provided. The method includes providing a drivetrain including a power input, a flywheel, and a gear assembly interconnecting the power input and the flywheel. The gear assembly includes an input shaft, an output shaft, a first input gear coupled to the input shaft, and a first output gear coupled to the output shaft and disposed in meshing engagement with the first input gear to define a first gear ratio. The gear assembly further includes a second input gear coupled to the input shaft, a second output gear coupled to the output shaft and disposed in meshing engagement with the second input gear to define a second gear ratio. The second gear ratio is a higher gear ratio than the first gear ratio. A first torque control device interconnects the input shaft and the first input gear for controlling torque communication between the input shaft and the first input gear. A second torque control device interconnects the output shaft and the second output gear for controlling torque communication therebetween. The method further includes disengaging the second torque control device to disconnect torque communication between output shaft and the second output gear, and increasing a rotational speed of the input shaft with the power input from an initial speed to a shift speed, with torque transmitted from the power input to the output shaft via the first input gear and the first output gear at the first gear ratio. The second torque control device may then be engaged to connect torque communication between the output shaft and the second output gear when the rotational speed of the input shaft is equal to the shift speed, while allowing the first input gear to overrun the input shaft via the first torque control device, with torque transmitted from the power input to the output shaft via the second input gear and the second output gear at the second gear ratio.

Accordingly, the gear assembly provides the first gear ratio for starting operation of the baler implement, i.e., for starting rotation of the flywheel, when a significant amount of torque is required to rotate the flywheel and move the plunger, and switches to the second gear ratio for normal operation of the baler implement. The two gear ratios provided by the gear assembly enable a size of an engine of the associated traction unit to be optimized for power/fuel efficiency during normal baling operations, without having to oversize the engine for the high torque associated with the initial startup of the baler implement.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
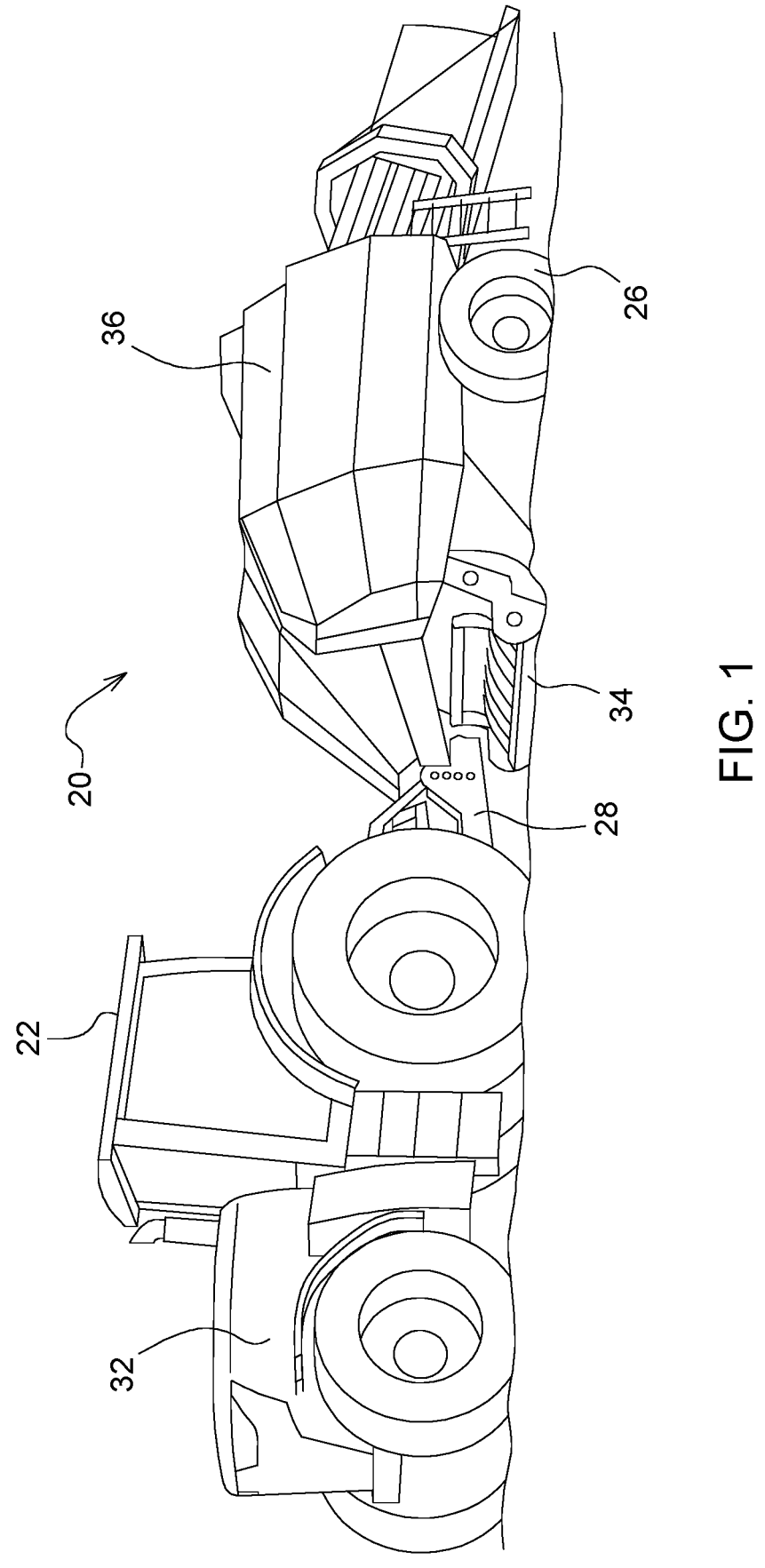
FIG. 1 is a schematic perspective view of a traction unit and a baler implement.
Figure 2:
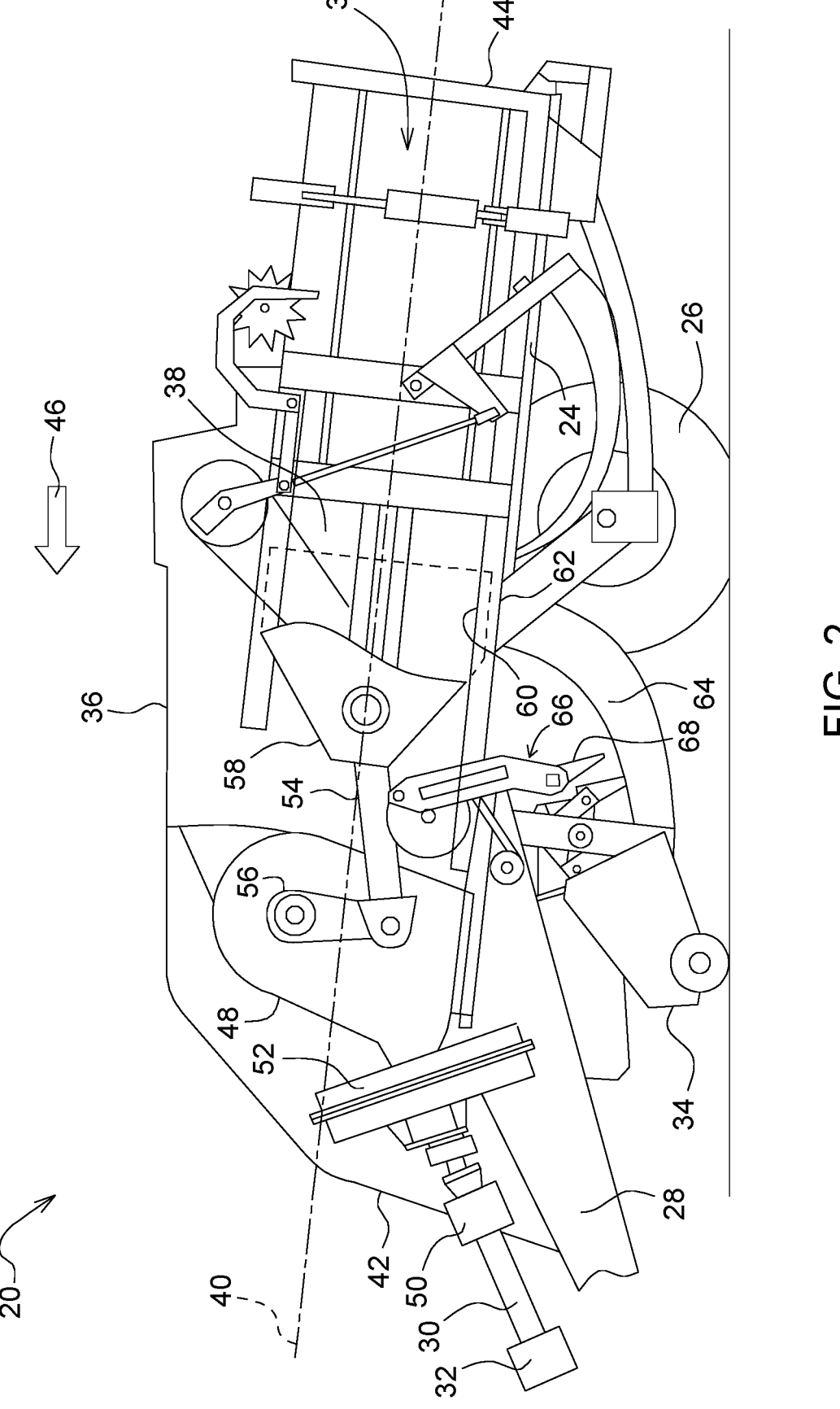
FIG. 2 is a schematic cross-sectional view of the baler implement.

Referring to the Figures, wherein like numerals indicate like parts throughout the several views, a baler implement is generally shown at 20. Referring to FIGS. 1 and 2, the baler implement 20 is shown as a large square baler. However, it should be appreciated that the teachings of this disclosure may be applied to other baler platforms, and are not limited to the example implementation of the large square baler shown in the Figures and described herein.

As shown in FIG. 1, a traction unit 22 or vehicle, such as but not limited to a tractor, is coupled to the baler implement 20 for pulling and powering the baler implement 20. However, it should be appreciated that in other implementations, the baler implement 20 may be self-propelled. As depicted in FIG. 1, the baler implement 20 may move across a field and gather and process crop material to form a bale. In the example implementation shown in the Figures and described herein, the baler implement 20 is configured to form the bale to include a parallelepiped shape, which is often referred to as a square bale or a large square bale. However, it should be appreciated that the baler implement 20 may be configured differently to form the bale to exhibit a different shape.

Referring to FIG. 2, the example implementation of the baler implement 20 includes a frame 24, ground engaging elements 26, such as but not limited to wheels or tracks, and a hitch 28 for attachment to the traction unit 22. The baler implement 20 includes a power input 30. The power input 30 is operable to rotate and communicate torque. In the example implementation shown in the Figures and described herein, the power input 30 is configured as a power take-off (PTO) shaft. However, in other implementations, the power input 30 may include an output from an internal combustion engine, a hydraulic motor, an electric engine, etc. The power input 30 is configured to receive rotational power from a power supply 32, such as the traction unit 22, for powering features and operations of the baler implement 20.

The baler implement 20 includes a pick-up 34 which gathers crop material from the ground surface and feeds it into the baler implement 20. The pick-up 34 mechanism may include various apparatus including, but not limited to, tines, forks, augers, conveyors, baffles, a cutter assembly, or any combination of the preceding. The baler implement 20 includes a baler housing 36 or body, which generally shields various internal components of the baler implement 20. The baler housing 36 includes multiple wall sections that form a compression chamber 38 configured for forming the crop material into the bale. The baler housing 36, which forms the compression chamber 38, extends along a central longitudinal axis 40. The central longitudinal axis 40 extends between a forward end 42 of the frame 24 or baler housing 36, and a rearward end 44 of the frame 24 or baler housing 36. As used herein, the term forward and rearward may be interpreted with respect to the direction of travel 46 of the baler implement 20 while gathering crop material.

The power input 30, e.g., the PTO shaft, is coupled to an input of a transmission 48 to provide rotational power to the baler implement 20 from the traction unit 22 or other associated vehicle or power supply 32. A gear assembly 50 and a flywheel 52 are functionally disposed between and interconnect the power input 30 and the transmission 48. The transmission 48 is coupled to the flywheel 52 for rotation with the flywheel 52. The transmission 48 is operable to convert rotation into linear movement of a connecting link 54. The transmission 48 includes a gearbox which converts the rotational motion of the power input 30 along the central longitudinal axis 40 of the baler implement 20 to an output of the transmission 48 having a rotational motion along a generally transverse axis of the baler implement 20. As used herein, the term "transverse" may be interpreted as extending perpendicular to the central longitudinal axis 40 of the baler implement 20, between a left side and a right side of the baler implement 20 relative to the direction of travel 46 of the baler implement 20 while gathering crop material.

The baler implement 20 includes a crank arm 56 connected to the output of the transmission 48. The connecting link 54 interconnects the crank arm 56 and a plunger 58. The plunger 58 is coupled to the connecting link 54 and is disposed within the compression chamber 38. The crank arm 56 rotates based upon the output of the transmission 48 and the plunger 58 moves within the compression chamber 38 in a reciprocating linear motion within the compression chamber 38 to form the bale as the crank arm 56 rotates. The plunger 58 extends into the compression chamber 38, thereby compressing the crop material, and then at least partially retracts from the compression chamber 38 to allow more crop material to enter the compression chamber 38.

As described above, the baler housing 36 includes multiple wall sections that form the compression chamber 38. As such, the baler housing 36 includes a bottom wall 60 that partially defines a lower boundary of the compression chamber 38. The bottom wall 60 defines a chamber inlet 62, which provides access for moving the crop material into the compression chamber 38.

A pre-compression passageway 64 interconnects the pick-up 34 and the chamber inlet 62. The pre-compression passageway 64 is a generally closed passage having an inlet adjacent to the pick-up 34 for receiving the crop material from the pick-up 34, and an outlet adjacent the chamber inlet 62 for discharging the crop material through the chamber inlet 62 and into the compression chamber 38. The pre-compression passageway 64 forms a generally arcuate path for moving the crop material rearward and upward relative to the direction of travel 46 of the baler implement 20.

The baler implement 20 includes a feed system 66 for moving the crop material through the pre-compression passageway 64 and into the compression chamber 38. The feed system 66 includes a plurality of feeder forks 68. In the example implementation described herein, the feeder forks 68 are timed with the plunger 58 to move the crop material into the compression chamber 38 when the plunger 58 is retracted. In baling operations, the feeder forks 68 are staged in an initial or starting position, are inserted into the pre-compression passageway 64 and sweep rearward and upward, pushing the crop material nearer and then into the chamber inlet 62, whereupon the feeder forks 68 are withdrawn from the pre-compression passageway 64 and returned to the initial or starting position for the subsequent cycle.

Figure 3:
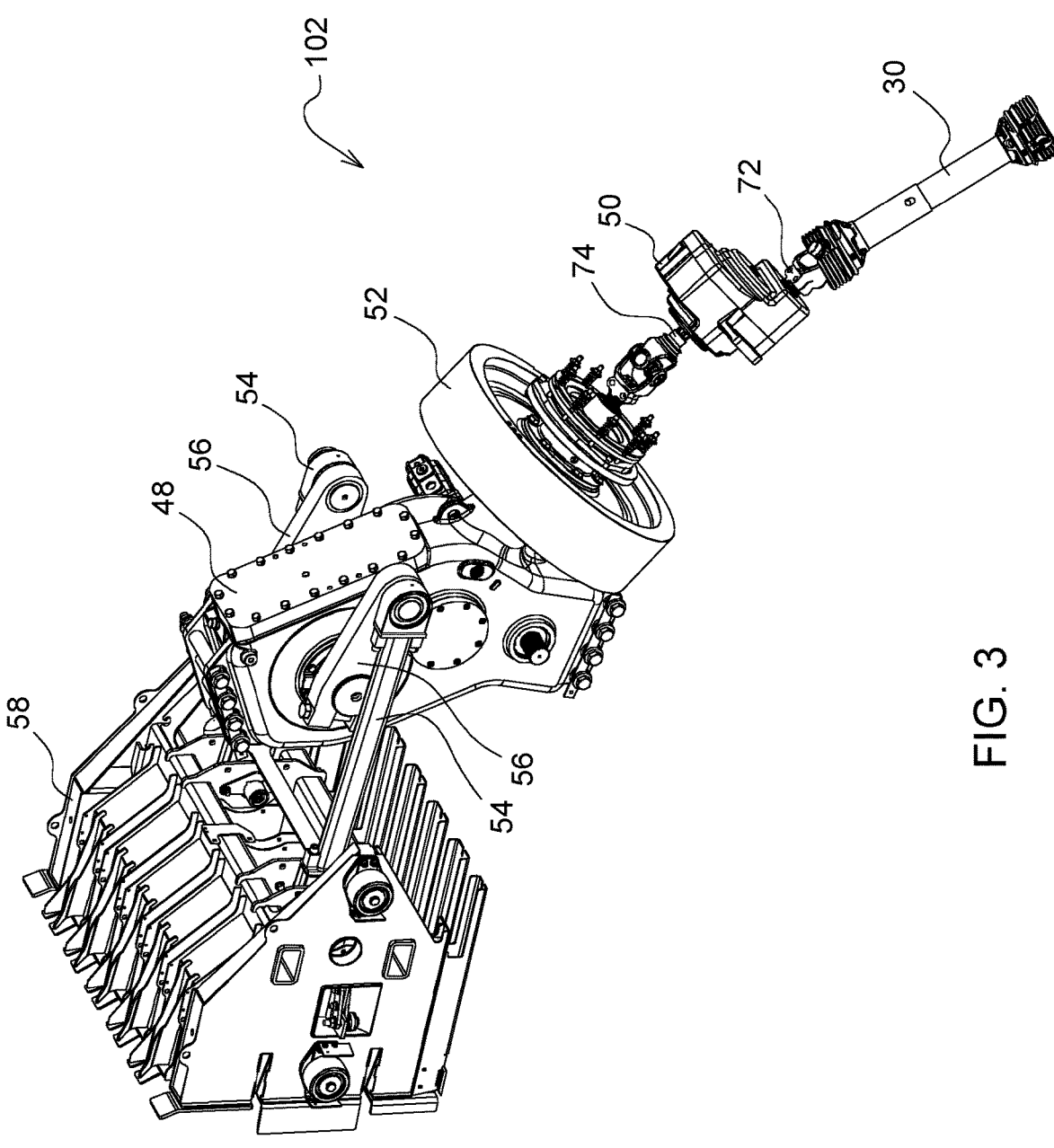
FIG. 3 is a schematic perspective view of a drivetrain of the baler implement.
Figure 4:
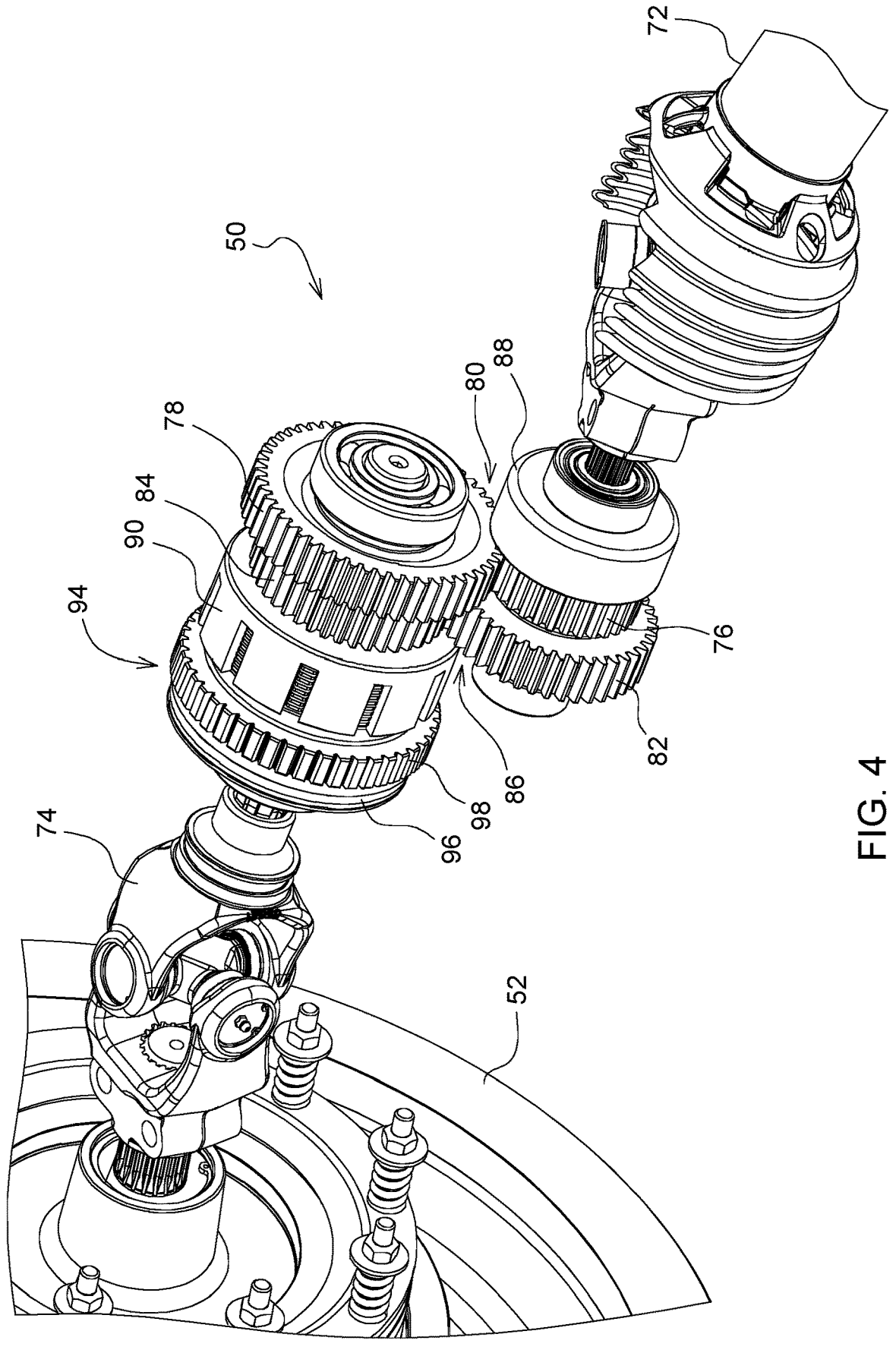
FIG. 4 is a schematic perspective view of a gear assembly of the baler implement.

Referring to FIG. 3, the gear assembly 50 includes an assembly housing 70 containing and supporting the components of the gear assembly 50. The assembly housing 70 may be mounted or attached to the frame 24, baler housing 36, or other component of the baler implement 20. The gear assembly 50 includes an input shaft 72 and an output shaft 74, both rotatably supported by the assembly housing 70. The input shaft 72 and the output shaft 74 may each be rotatably supported relative to the assembly housing 70 via one or more respective bearings, as is understood by those skilled in the art.

The input shaft 72 is coupled to the power input 30 for rotation with the power input 30. The input shaft 72 is configured to receive rotational power from the power input 30. The flywheel 52 is coupled to the output shaft 74 of the gear assembly 50 for rotation with the output shaft 74. The flywheel 52 is configured to receive rotational power from the input shaft 72 and communicate the rotational power to the transmission 48. The flywheel 52 is weighted to provide a rotating mass during operation to provide momentum and resist changes in speed of the plunger 58 during operation while compressing the crop material.

Referring to FIGS. 4-7, the gear assembly 50 includes a first input gear 76 coupled to the input shaft 72, and a first output gear 78 coupled to the output shaft 74. The first input gear 76 and the first output gear 78 are disposed in meshing engagement with each other to define a first gear ratio connecting the input shaft 72 and the output shaft 74, i.e., connecting the power input 30 with the flywheel 52 and the plunger 58. The first input gear 76 and the first output gear 78 define a first gear set 80, and may include, but are not limited to, spur gears, helical gears, double helical gears, or herringbone gears.

The gear assembly 50 further includes a second input gear 82 coupled to the input shaft 72, and a second output gear 84 coupled to the output shaft 74. The second input gear 82 and the second output gear 84 are disposed in meshing engagement with each other to define a second gear ratio connecting the input shaft 72 and the output shat, i.e., connecting the power input 30 with the flywheel 52 and the plunger 58. The second input gear 82 and the second output gear 84 define a second gear set 86, and may include, but are not limited to, spur gears, helical gears, double helical gears, or herringbone gears.

As described above, the first gear set 80 defines a first gear ratio, and the second gear set 86 defines a second gear ratio. The first gear ratio and the second gear ratio may be expressed by ratio of the number of teeth of the output gear divided by the number of teeth of the input gear. For example, an output gear having twenty teeth and an input gear having ten teeth would define a gear ratio of two (2). Alternatively, the first gear ratio and the second gear ratio may be expressed as the number of revolutions of the output shaft 74 per number of revolutions of the input shaft 72, e.g., a gear ratio of one to two (1:2) expresses one revolution of the output shaft 74 per each two revolutions of the input shaft 72.

The second gear ratio is a higher gear ratio than the first gear ratio. Stated differently, the first gear ratio is a lower gear ratio than the second gear ratio. In one implementation, the second gear ratio is a one to one (1:1) gear ratio, in which one revolution of the output shaft 74 occurs for each one revolution of the input shaft 72, and the first gear ratio is lower than one to one (1:1), for example, one to two (1:2), in which one revolution of the output shaft 74 occurs for each two revolutions of the input shaft 72. A lower gear ratio provides greater acceleration and greater output torque for a given rotational input speed from the power source, whereas a higher gear ratio provides a higher output speed for the given rotational input speed from the power source.

The gear assembly 50 further includes a first torque control device 88 and a second torque control device 90. The first torque control device 88 interconnects the input shaft 72 and one of the first input gear 76 and the second input gear 82 for controlling torque communication therebetween. The other of the first input gear 76 and the second input gear 82, i.e., the one not coupled to the input shaft 72 via the first torque control device 88, may be directly connected to the input shaft 72 for continuous rotation therewith. The second torque control device 90 interconnects the output shaft 74 and one of the first output gear 78 and the second output gear 84 for controlling torque communication therebetween. The other of the first output gear 78 and the second output gear 84, i.e., the one not coupled to the output shaft 74 via the second torque control device 90, may be directly connected to the output shaft 74 for continuous rotation therewith.

At least one of the first torque control device 88 and the second torque control device 90 is selectively controllable to switch torque communication between the power input 30 and the flywheel 52 between the first gear ratio and the second gear ratio. The first torque control device 88 and/or the second torque control device 90 may be controlled via a control signal. The control signal may include, but is not limited to, a hydraulic signal, an electric signal, or a pneumatic signal. In one implementation, a hydraulic control valve 92 may be selectively controlled via an electronic signal to connect or disconnect fluid pressure to the first torque control device 88 and/or the second torque control device 90 for engagement and/or disengagement respectively.

The first torque control device 88 may include, but is not limited to, one of a one way clutch that is operable to communicate torque in a first rotational direction and freewheel in a second rotational direction, or a selectively controllable clutch that is controllable between a first state operable to connect torque communication and a second state operable to disconnect torque communication. In the example implementation shown in the Figures and described herein, the first torque control device 88 is a one way clutch operable to communicate torque in a first rotational direction and freewheel in a second rotational direction. The first torque control device 88 interconnects the first input gear 76 and the input shaft 72, with the second input gear 82 being rotatably fixed relative to the input shaft 72 for continuous rotation with the input shaft 72 at a shared rotational speed.

The second torque control device 90 may include, but is not limited to, one of a one way clutch operable to communicate torque in a first rotational direction and freewheel in a second rotational direction, or a selectively controllable clutch that is controllable between a first state operable to connect torque communication and a second state operable to disconnect torque communication. In the example implementation shown in the Figures and described herein, the second torque control device 90 is a selectively controllable clutch that is controllable between a first state operable to connect torque communication and a second state operable to disconnect torque communication, with the second torque control device 90 interconnecting the second output gear 84 and the output shaft 74. The first output gear 78 is rotatably fixed relative to the output shaft 74 for continuous rotation with the output shaft 74 at a shared rotational speed.

Figure 5:
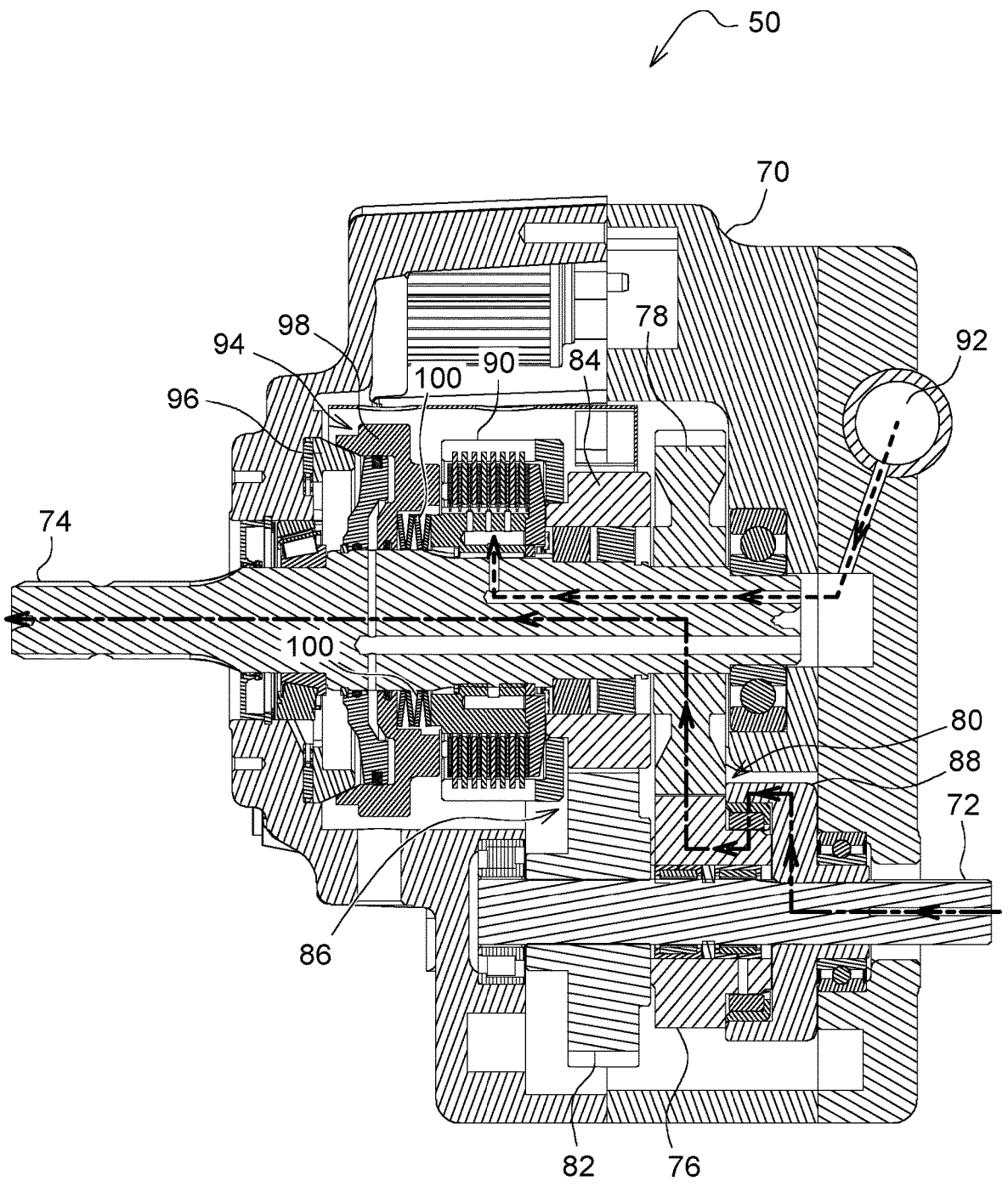
FIG. 5 is a schematic cross-sectional view of the gear assembly showing a second torque control device disengaged and a power path through a first gear set.
Figure 6:
FIG. 6 is a schematic cross-sectional view of the gear assembly showing the second torque control device engaged and a power path through a second gear set.
Figure 7:
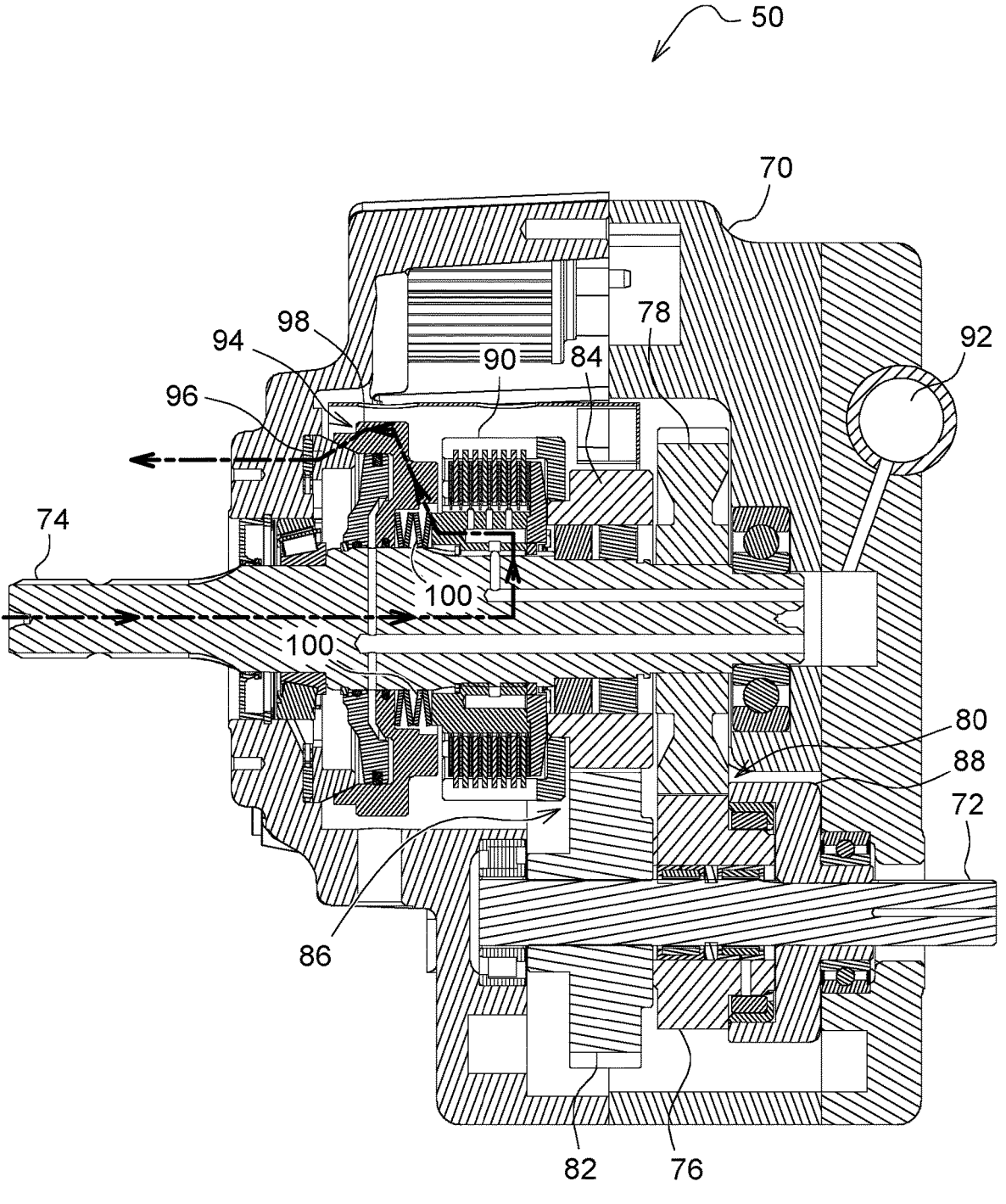
FIG. 7 is a schematic cross-sectional view of the gear assembly showing the second torque control device disengaged and a brake system engaged.

Referring to FIGS. 5-7, the gear assembly 50 may further include a brake system 94. The brake system 94 may include, for example, a friction element 96 that is coupled to a stationary component of the gear assembly 50. The stationary component of the gear assembly 50 may include a component that does not rotate with either the input shaft 72 or the output shaft 74. For example, the stationary component may include the assembly housing 70.

The brake system 94 may further include a brake element 98. The brake element 98 is attached to the output shaft 74 for rotation therewith. The brake element 98 is selectively controllable between a brake position and a release position. When the brake element 98 is controlled into the brake position, the brake element 98 is disposed in frictional engagement with the friction element 96 to resist rotation of the output shaft 74. The brake element 98 may be controlled to secure the output shaft 74 in a desired rotational position, thereby securing the plunger 58 in a desired longitudinal position within the compression chamber 38. As such, the brake system 94 may be controlled to stop movement of the plunger 58 and hold the position of the plunger 58 with no compressive forces acting on the plunger 58 so that start-up torque is minimized. When the brake element 98 is controlled into the release position, the brake element 98 is not disposed in frictional engagement with the friction element 96, thereby allowing the output shaft 74 to rotate freely relative to the stationary component, e.g., the assembly housing 70.

The brake element 98 may be controlled between the brake position and the release position via a control signal. The control signal may include, but is not limited to, a hydraulic signal, an electric signal, or a pneumatic signal. In one implementation, the hydraulic control valve 92 may be selectively controlled via an electronic signal to connect or disconnect fluid pressure to the brake element 98 to move the brake element 98 between into the brake position for frictional engagement with the friction element 96. The brake system 94 may further include a spring or other bias device 100 to urge the brake element 98 into the release position upon the release of the fluid pressure from the control valve 92 to apply the brake element 98.

A method of controlling the baler implement 20 is also provided. The method includes providing a drivetrain 102 for the baler implement 20. The drivetrain 102 includes the power input 30, the flywheel 52, and the gear assembly 50 interconnecting the power input 30 and the flywheel 52. As described above, the gear assembly 50 includes the input shaft 72, the output shaft 74, the first input gear 76 coupled to the input shaft 72, and the first output gear 78 coupled to the output shaft 74 and disposed in meshing engagement with the first input gear 76 to define the first gear ratio. The gear assembly 50 provided further includes the second input gear 82 coupled to the input shaft 72, and the second output gear 84 coupled to the output shaft 74 and disposed in meshing engagement with the second input gear 82 to define the second gear ratio. As described above, the second gear ratio is a higher gear ratio than the first gear ratio.

The gear assembly 50 provided by the disclosed method further includes the first torque control device 88 interconnecting the input shaft 72 and the first input gear 76 for controlling torque communication between the input shaft 72 and the first input gear 76. As described above, the first torque control device 88 may include, but is not limited to, one of a one way clutch operable to communicate torque in a first rotational direction and freewheel in a second rotational direction, or a selectively controllable clutch that is controllable between a first state operable to connect torque communication and a second state operable to disconnect torque communication.

The gear assembly 50 provided by the disclosed method further includes the second torque control device 90 interconnecting the output shaft 74 and the second output gear 84 for controlling torque communication therebetween. As described above, the second torque control device 90 may include, but is not limited to, one of a one way clutch operable to communicate torque in a first rotational direction and freewheel in a second rotational direction, or a selectively controllable clutch that is controllable between a first state operable to connect torque communication and a second state operable to disconnect torque communication.

Referring to FIG. 5, the method further includes disengaging the second torque control device 90 to disconnect torque communication between output shaft 74 and the second output gear 84. The manner in which the second torque control device 90 may be disengaged is dependent upon the specific type and operation of the second torque control device 90. For example, referring to the implementation of the gear assembly 50 described above and shown in the figures, the control valve 92 may be controlled via an electronic signal to communicate fluid pressure to the second torque control device 90, thereby moving the second torque control device 90 into its respective second state to disconnect torque communication between the output shaft 74 and the second output gear 84.

Once the second torque control device 90 has been disengaged to disconnect torque communication between the output shaft 74 and the second output gear 84, a rotational speed of the input shaft 72 may be increased with the power input 30. The rotational speed of the input shaft 72 is coupled to the power source. Accordingly, increasing the speed of the power source increases the rotational speed of the input shaft 72. The speed of the input shaft 72 is increased from an initial speed to a shift speed. The initial speed may include, for example, a rotational speed of zero, i.e., full stop. In other implementations, the initial speed may include a rotational speed that is greater than zero but less than the shift speed. The speed of the input shaft 72 is increased from the initial speed to the shift speed with torque transmitted from the power input 30 to the output shaft 74 via the first input gear 76 and the first output gear 78 at the first gear ratio. The shift speed is the rotational speed of the input shaft 72 at which torque transfer through the gear assembly 50 is shifted from the first gear set 80 at the first gear ratio to the second gear set 86 at the second gear ratio.

By using the first gear ratio of the gear assembly 50 while increasing the rotational speed of the input shaft 72 from the initial speed up to the shift speed, the output shaft 74, the weighted flywheel 52 and the plunger 58 may be brought up to the shift speed using the mechanical advantage provided by the lower gear ratio of the first gear set 80, i.e., the first gear ratio. The mechanical advantage of the lower gear ratio of the first gear set 80 enables the use of a power source having a lower power output than would be required without the first gear ratio provided by the first gear set 80.

Referring to FIG. 6, once the rotational speed of the input shaft 72 has been increased to and equals the shift speed, then the second torque control device 90 may be engaged to connect torque communication between the output shaft 74 and the second output gear 84. With the second torque control device 90 engaged, rotational power is transmitted from the power input 30 to the output shaft 74 via the second input gear 82 and the second output gear 84 at the second gear ratio. The first torque control device 88 disengaged torque communication between the first input gear 76 and the input shaft 72 or allows the first input gear 76 to overrun the input shaft 72 via the first torque control device 88. Accordingly, with the second torque control device 90 engaged, the rotational speed of the input shaft 72 may be further increased to a final rotational speed, which is greater than the shift speed, with the first torque control device 88 allowing the first input gear 76 to overrun the input shaft 72, or alternatively disconnecting torque communication between the input shaft 72 and the first input gear 76.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A baler implement comprising:
a power input operable to rotate and communicate torque;
a gear assembly having an input shaft and an output shaft, wherein the input shaft is coupled to the power input for rotation with the power input;
a flywheel coupled to the output shaft of the gear assembly for rotation with the output shaft;
wherein the gear assembly includes:
a first input gear coupled to the input shaft;
a first output gear coupled to the output shaft and disposed in meshing engagement with the first input gear to define a first gear ratio between the power input and the flywheel;
a second input gear coupled to the input shaft;
a second output gear coupled to the output shaft and disposed in meshing engagement with the second input gear to define a second gear ratio between the power input and the flywheel;
a first torque control device interconnecting the input shaft and one of the first input gear and the second input gear for controlling torque communication therebetween;
a second torque control device interconnecting the output shaft and one of the first output gear and the second output gear for controlling torque communication therebetween;
wherein at least one of the first torque control device and the second torque control device is selectively controllable to switch torque communication between the power input and the flywheel between the first gear ratio and the second gear ratio; and
wherein the first torque control device is a one way clutch operable to communicate torque in a first rotational direction and freewheel in a second rotational direction, with the first torque control device interconnecting the first input gear and the input shaft.

2. The baler implement set forth in claim 1, wherein the first torque control device includes one of a one way clutch operable to communicate torque in a first rotational direction and freewheel in a second rotational direction, or a selectively controllable clutch that is controllable between a first state operable to connect torque communication and a second state operable to disconnect torque communication.

3. The baler implement set forth in claim 1, wherein the second input gear is rotatably fixed relative to the input shaft for continuous rotation with the input shaft at a shared rotational speed.

4. The baler implement set forth in claim 1, wherein the second torque control device includes one of a one way clutch operable to communicate torque in a first rotational direction and freewheel in a second rotational direction, or a selectively controllable clutch that is controllable between a first state operable to connect torque communication and a second state operable to disconnect torque communication.

5. The baler implement set forth in claim 1, wherein the second torque control device is a selectively controllable clutch that is controllable between a first state operable to connect torque communication and a second state operable to disconnect torque communication, with the second torque control device interconnecting the second output gear and the output shaft.

6. The baler implement set forth in claim 5, wherein the first output gear is rotatably fixed relative to the output shaft for continuous rotation with the output shaft at a shared rotational speed.

7. The baler implement set forth in claim 1, further comprising a friction element coupled to a stationary component of the gear assembly.

8. The baler implement set forth in claim 7, further comprising a brake element attached to the output shaft for rotation therewith, wherein the brake element is selectively controllable between a brake position in which the brake element is disposed in frictional engagement with the friction element, and a release position in which the brake element is not disposed in frictional engagement with the friction element.

9. The baler implement set forth in claim 1, further comprising a transmission coupled to the flywheel for rotation therewith, wherein the transmission is operable to convert rotation from the flywheel into linear movement of a connecting link.

10. The baler implement set forth in claim 9, further comprising a plunger coupled to the connecting link and disposed within a compression chamber, wherein the plunger is moveable within the compression chamber in a reciprocating linear motion to form a bale having a parallelepiped shape.

11. The baler implement set forth in claim 1, wherein the power input is a power takeoff shaft.

12. A gear assembly for connecting torque communication between a power input and a flywheel of a square baler implement, the gear assembly comprising:
an assembly housing;
an input shaft rotatably supported by the assembly housing;
an output shaft rotatably supported by the assembly housing;
a first input gear coupled to the input shaft;
a first output gear coupled to the output shaft and disposed in meshing engagement with the first input gear to define a first gear ratio;
a second input gear coupled to the input shaft;
a second output gear coupled to the output shaft and disposed in meshing engagement with the second input gear to define a second gear ratio;
a first torque control device interconnecting the input shaft and one of the first input gear and the second input gear for controlling torque communication therebetween;
a second torque control device interconnecting the output shaft and one of the first output gear and the second output gear for controlling torque communication therebetween;
wherein at least one of the first torque control device and the second torque control device is selectively controllable to switch torque communication between the first gear ratio and the second gear ratio; and
wherein the first torque control device is a one way clutch operable to communicate torque in a first rotational direction and freewheel in a second rotational direction, with the first torque control device interconnecting the first input gear and the input shaft, and with the second input gear rotatably fixed relative to the input shaft for continuous rotation with the input shaft at a shared rotational speed.

13. The gear assembly set forth in claim 12, wherein the first torque control device includes one of a one way clutch operable to communicate torque in a first rotational direction and freewheel in a second rotational direction, or a selectively controllable clutch that is controllable between a first state operable to connect torque communication and a second state operable to disconnect torque communication.

14. The gear assembly set forth in claim 12, wherein the second torque control device includes one of a one way clutch operable to communicate torque in a first rotational direction and freewheel in a second rotational direction, or a selectively controllable clutch that is controllable between a first state operable to connect torque communication and a second state operable to disconnect torque communication.

15. The gear assembly set forth in claim 12, wherein the second torque control device is a selectively controllable clutch that is controllable between a first state operable to connect torque communication and a second state operable to disconnect torque communication, with the second torque control device interconnecting the second output gear and the output shaft, and with the first output gear rotatably fixed relative to the output shaft for continuous rotation with the output shaft at a shared rotational speed.

16. The gear assembly set forth in claim 12, further comprising a friction element coupled to the assembly housing.

17. The gear assembly set forth in claim 16, further comprising a brake element attached to the output shaft for rotation therewith, wherein the brake element is selectively controllable between a brake position in which the brake element is disposed in frictional engagement with the friction element, and a release position in which the brake element is not disposed in frictional engagement with the friction element.

18. A method of controlling a baler implement, the method comprising:

providing a drivetrain including a power input, a flywheel, and a gear assembly interconnecting the power input and the flywheel, the gear assembly including:

an input shaft;

an output shaft;

a first input gear coupled to the input shaft;

a first output gear coupled to the output shaft and disposed in meshing engagement with the first input gear to define a first gear ratio;

a second input gear coupled to the input shaft, with the second input gear rotatably fixed relative to the input shaft for continuous rotation with the input shaft at a shared rotational speed;

a second output gear coupled to the output shaft and disposed in meshing engagement with the second input gear to define a second gear ratio, wherein the second gear ratio is a higher gear ratio than the first gear ratio;

a first torque control device interconnecting the input shaft and the first input gear for controlling torque communication between the input shaft and the first input gear, wherein the first torque control device is a one way clutch operable to communicate torque in a first rotational direction and freewheel in a second rotational direction;

a second torque control device interconnecting the output shaft and the second output gear for controlling torque communication therebetween;

disengaging the second torque control device to disconnect torque communication between output shaft and the second output gear;

increasing a rotational speed of the input shaft with the power input from an initial speed to a shift speed, with torque transmitted from the power input to the output shaft via the first input gear and the first output gear at the first gear ratio; and engaging the second torque control device to connect torque communication between the output shaft and the second output gear when the rotational speed of the input shaft is equal to the shift speed, while allowing the first input gear to overrun the input shaft via the first torque control device, with torque transmitted from the power input to the output shaft via the second input gear and the second output gear at the second gear ratio.

* * * * *